Aug. 3, 1965
W. DUBILIER
3,198,934
WOUND-PAPER CAPACITORS AND MANUFACTURING
METHOD AND APPARATUS
Filed June 27, 1961
3 Sheets-Sheet 1
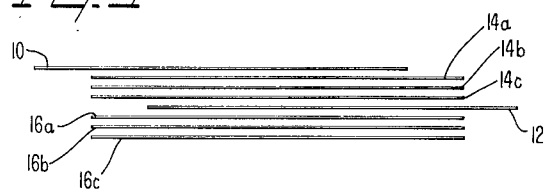
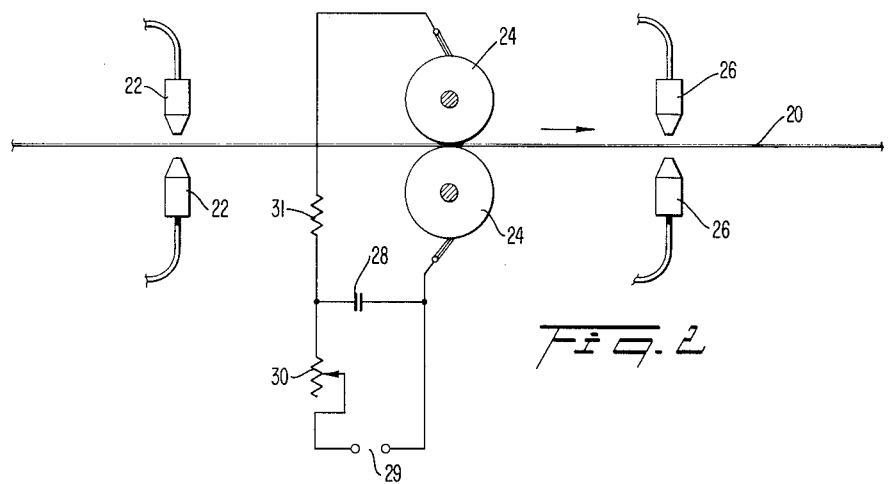
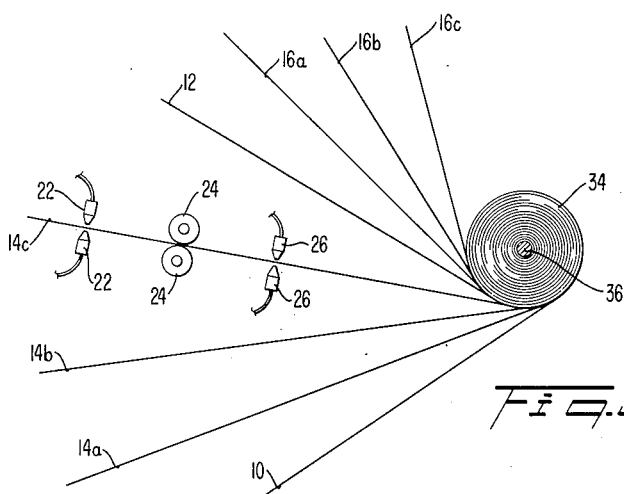
INVENTOR.
WILLIAM DUBILIER
BY
ATTORNEY Aug. 3, 1965
W. DUBILIER
3,198,934
WOUND-PAPER CAPACITORS AND MANUFACTURING
METHOD AND APPARATUS
Filed June 27, 1961
3 Sheets-Sheet 2
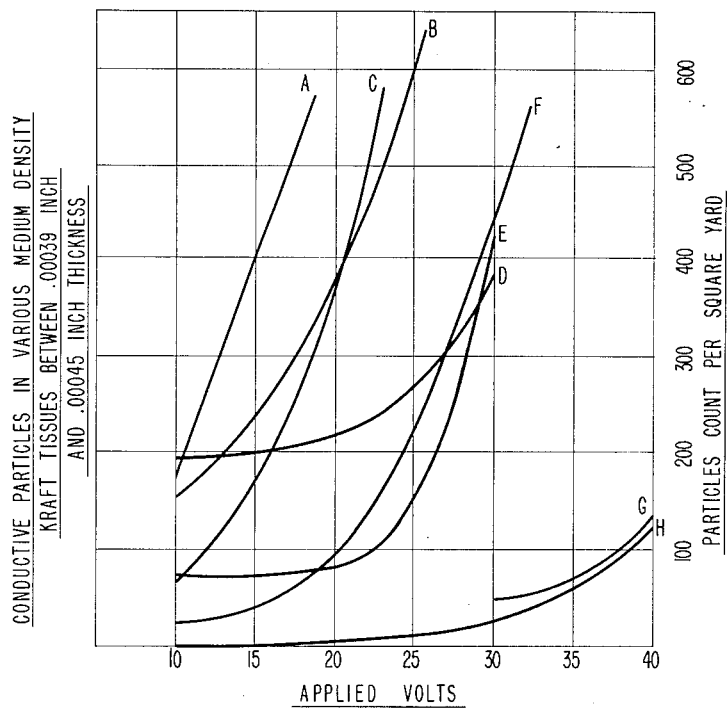
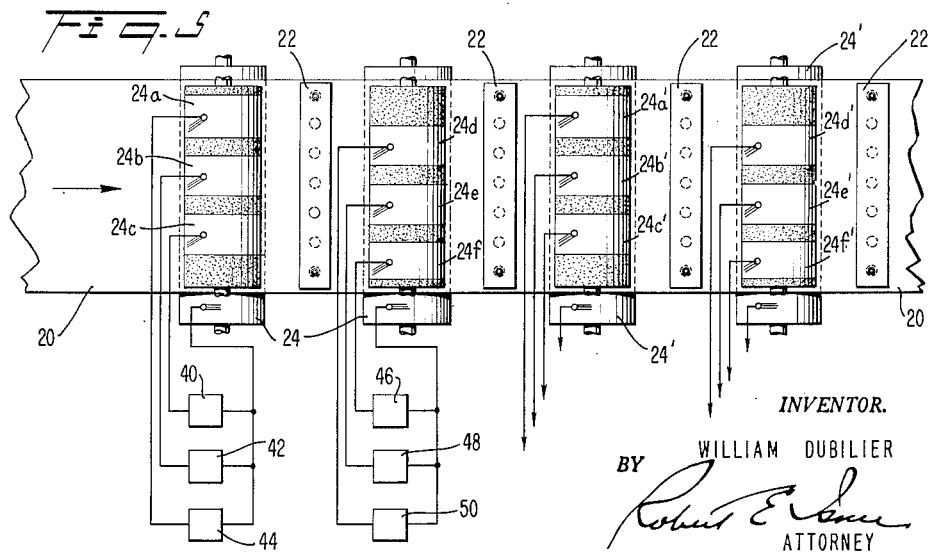
INVENTOR.
WILLIAM DUBILIER
BY
ATTORNEY Aug. 3, 1965 W. DUBILIER 3,198,934
WOUND-PAPER CAPACITORS AND MANUFACTURING
METHOD AND APPARATUS
Filed June 27, 1961 3 Sheets-Sheet 3
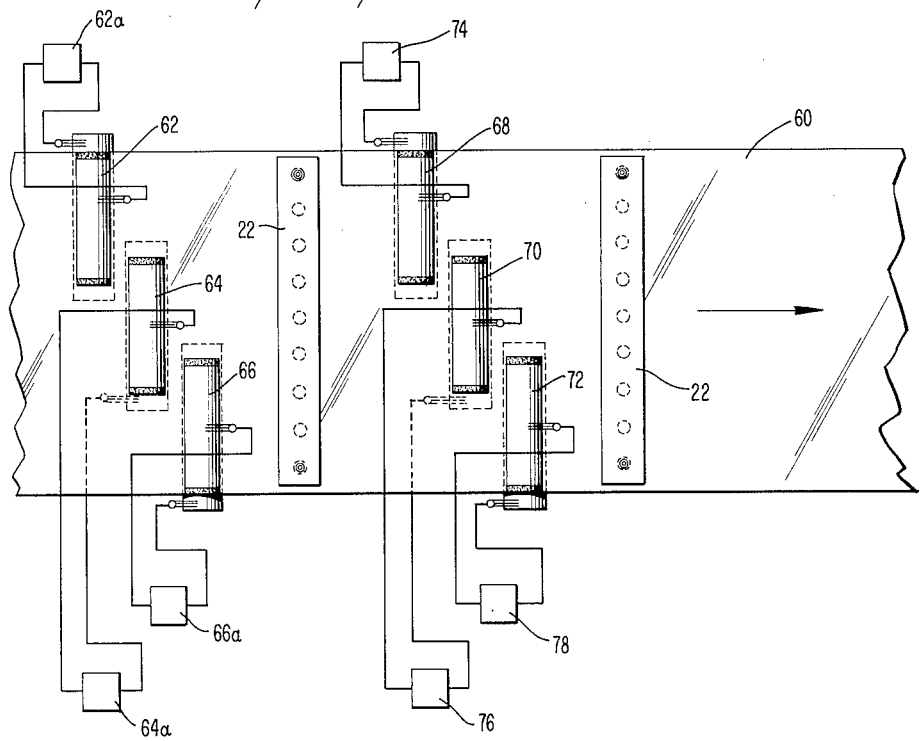
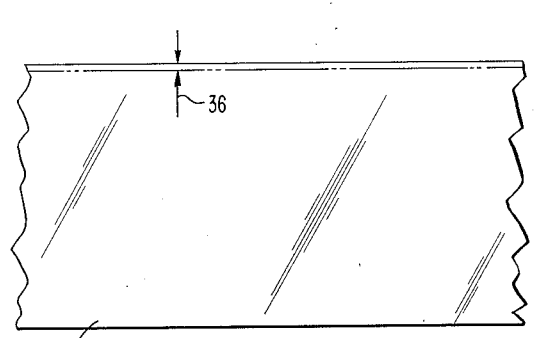
INVENTOR.
WILLIAM DUBILIER
BY
ATTORNEY

# United States Patent Office 3,198,934
Patented Aug. 3, 1965

3,198,934
WOUND-PAPER CAPACITORS AND MANUFAC-
TURING METHOD AND APPARATUS
William Dubilier, New Rochelle, N.Y., assignor to
Cornell-Dubilier Electric Corporation, South Plainfield,
N.J., a corporation of Delaware
Filed June 27, 1961, Ser. No. 120,000
5 Claims. (Cl. 219—384)

This invention relates to capacitors and particularly to an improved construction for convolutely wound capacitors formed of discrete smooth surfaced foil and interleaved paper dielectric tissue.

This application is a continuation-in-part of my application Serial No. 84,598, filed January 24, 1961.

Capacitor tissues are among the most expensive papers made. Such tissues are usually less than .001 inch thick and thicknesses as small as .00025 inch are commonly employed. Despite the great care taken in the fabrication of such capacitor tissues, it has not been possible to produce a completely homogenous paper or to eliminate the undesired presence of extremely small conductive and semi-conductive particles therefrom, usually metal and/or metal oxides, that inherently result from the contact of the tissues with the metal components of the paper making machinery and from the presence of such materials in the water employed during its fabrication. For convenience, such particles will be hereinafter generally termed "conductive" particles irrespective of their nature.

The lack of homogeneity and the undesired presence of such conductive particles have long been recognized as adversely effecting the dielectric strength and insulation resistance of capacitor tissues. Accommodation therefor in capacitor design is conventionally made by the utilization of pluralities of tissues intermediate the electrode elements, by limitation of the potentials across the dielectric for a given total thickness of paper and by the inclusion of an additional dielectric tissue over the calculated required thickness thereof for a given rating. Despite the above precautions and safety factors inherent therein, convolutely wound capacitors and particularly power capacitors, even when operated under conditions well below their rated values, are too often subject to destructive breakdowns. I have discovered that most of these destructive breakdowns are attributable to the progressively deteriorating effect of incipient or actual corona generation selectively induced, at comparatively low voltages, by the presence of these undesired conductive particles in the capacitor tissue disposed adjacent to and in abutting relation with a smooth surfaced electrode foil.

Pursuant to one notably important aspect of my invention, novel convolutely wound capacitors are formed in which at least a paper dielectric layer disposed adjacent to a smooth surfaced foil electrode is free of conductive particles to thereby realize the corona suppressing properties of smooth surfaced foil electrodes. This is a sharp departure from previous and present practice and permits utilization and reliance upon the total thickness of unmetallized dielectric media in the adoption of voltage ratings as well as in a permitted reduction in dielectric thickness for a given rating.

A further notably important aspect of the present invention resides in the treatment of individual unmetallized paper dielectric tissues, as the same are received from the manufacturer and presently directly incorporated in capacitors, prior to their incorporation into a capacitor structure. This treatment includes subjecting these tissues to an electrical discharge of extremely short duration at a voltage and energy level sufficient to selectively remove most, if not all, of the conductive particles therein, prior to the incorporation of such tissues into a capacitor. In association with the above, it is preferable to adjunctively utilize localized suction apparatus to remove any loose particulate matter from the tissue surfaces subsequent to and, if desired, in advance of, the subjection of the tissues to the above mentioned treatment.

One object of this invention thus resides in the provision of unmetallized paper dielectric capacitors having improved voltage ratings and operating life.

Another object resides in unmetallized paper dielectric capacitors having improved dielectric qualities and greater life in regard to permissible safe operating voltage for a given thickness per layer or layers of paper dielectric tissue disposed intermediate the smooth metal layers that form the opposite poles of the capacitor.

A further object of the invention resides in a novel treatment for unmetallized paper dielectric tissues and more particularly to an integrated treating and winding operation in the manufacture of capacitors.

The nature of the invention will be better appreciated and further objects and features therein will be apparent from the following detailed description of an illustrated embodiment of the various aspects and a method of carrying out the invention, wherein reference is made to the accompanying drawing:

FIGURE 1 is an expanded schematic section of a portion of a convolutely wound capacitor as an embodiment of one aspect of the invention;

FIGURE 2 is a diagrammatic view of a method of, and apparatus for, treatment of the paper forming the dielectric layers of the capacitor in FIGURE 1;

FIGURE 3 is a diagrammatic view representing an example of the treating method and apparatus as integrated with a capacitor winding operation;

FIGURE 4 is a graph indicating the prevalence of detected conductive particles in various commercial dielectric papers;

FIGURE 5 is a diagrammatic representation of another form of treating method and apparatus as a modification of that in FIGURE 2;

FIGURE 6 is another diagrammatic representation of still another form of treating method and apparatus;

FIGURE 7 is a portion of a treated paper strip.

Referring preliminarily to FIGURE 4, the graph there set forth is illustrative of the quantitative presence of conductive particles present in various commercial unmetallized paper dielectric tissues as produced by various manufacturers.

The curves show that greatly larger number of the conductive particles present are revealed as the electrical test voltage is increased even though the test voltages set forth are well below those which could normally be developed across the thickness of the paper in use.

FIGURE 1 shows a greatly enlarged fragmentary cross-section of a wound capacitor. Such includes electrode elements 10 and 12 of smooth surfaced aluminum or other metal foil with a plurality of interleaved strips of paper dielectric tissue 14a, 14b and 14c. Conventionally there is provided additional layers of paper dielectric tissue 16a, 16b and 16c, for spacing foil 12 from the next convolution (not shown) of foil 10. The wound capacitor is impregnated as with oil or other suitable liquid or solid impregnant.

FIGURE 2 diagrammatically illustrates, by way of example, the essentials of one form of treatment applied to a commercially available unmetallized paper dielectric strip 20 for eliminating the undesired conductive particles therefrom. The paper dielectric strip 20 is drawn to the right, as illustrated, sequentially past a pair of suction heads 22, intermediate a pair of axially aligned metal electrode elements 24 and a second pair of suction heads 26. Advantageously the suction heads 22 and 26 are nonmetallic and may assume any convenient form for effectively removing any loose particulate matter from the strip both preparatory and subsequent to the treatment thereof during displacement past the electrodes 24.

The electrodes 24, such as the illustrated exemplary rollers, are arranged in axial alignment in abutting relationship with the opposite surfaces of the unmetallized paper dielectric strip 20 and may desirably be biased into contact therewith. Potential across the electrodes is supplied by a capacitor 28 which is charged, from a voltage source 29 and through a variable resistor 30, to an energy level sufficient to effect selective removal of the undesired conductive particles from the interposed dielectric tissue but insufficient to effect a breakdown of the paper in the absence of the presence of a conductive particle therein. In operation of the subject unit, the presence of a conductive particle in the advancing paper disposed intermediate the electrodes 24, whether surface exposed or not, will result in an extremely rapid, high current discharge of the condenser 28 through the resistance 31, of low value, and through the conducting particle. Such short duration, high current, discharge will function to selectively remove, presumably by vaporization thereof, the undesired conductive particles. The value of the resistor 30 should be such as to effect a relatively fast recharging of the capacitor 28 after discharge thereof and yet effectively and practically isolate the voltage source from the condenser discharge current as well prevent a comparatively sustained arc current from being supplied by the power source through a conductive particle. The values of capacitance and voltage employed will vary depending upon various factors, such as the thickness of the paper dielectric tissue being treated and the speed of paper advance, but such values may readily be ascertained empirically by one skilled in the art for paper dielectric tissues in thickness up to .001 inch. The voltage across the charged condenser should be sufficiently high to selectively clear conductive particles even where they do not extend all the way through the paper but insufficient to effect a breakdown of the tissue in the absence of such conductive particles.

The above disclosed teratment of unmetallized paper dielectric media should be carefully distinguished from the utilization of a relatively slow arc discharge of long duration such as that that would result from the connection of a low voltage supply directly across a thicker paper as disclosed in U.S. Patent 692,834 of 1902 to Davis and from the treatment of metal coated dielectrics wherein the metal coating serves as one electrode and the portions of the metal coating surrounding a fault are burned away.

FIGURE 3 illustrates the integration of the treatment method and apparatus into a capacitor winding machine wherein a capacitor 34 being wound on a driven mandrel 36 draws strips of smooth surfaced foil 10 and 12 and interleaving uncoated paper dielectric strips 14a, 14b, 14c and 16a, 16b, 16c from respective supply rolls thereof, not shown. Each of the uncoated dielectric strips adjoining a smooth foil is drawn past a treatment zone disposed intermediate its supply roll and the winding mandrel.

For convenience only one set of treatment heads 22, 24 and 26 are schematically illustrated in FIGURE 3, cooperating with strip 14c, but it will be understood that like apparatus, as more fully disclosed in FIGURE 2, is provided for each such strip of dielectric tissue.

As will be apparent to those skilled in this art, the dielectric tissues may be pretreated either by the capacitor fabricator or by the paper manufacturer. When such pretreatment is employed, care must be taken to prevent recontamination of the tissues as by covering or enclosing the winding machines and by effecting subsequent operations in a substantially conductive particle free atmosphere.

FIGURE 5 is a schematic representation of another form of the novel treatment method and apparatus and one that is particularly adapted to a pretreatment operation as mentioned above utilizing a so-called "jumbo" roll of extended length and width of paper dielectric tissue. As there illustrated, a multiple width strip of unmetallized dielectric tissue 20 is advanced, in the direction indicated, through a series of selectively positioned electrode elements. The first set of electrode elements consists of a lower roller 24 extending across the width of the strip and, as shown as an example, three spaced and coaxially disposed upper metal rollers 24a, 24b and 24c each individually connected to a respective condenser discharge circuit of the type heretofore described and illustrated in FIGURE 2 and here schematically represented as the boxes 40, 42 and 44. Electrode rollers 24a, 24b and 24c may, as illustrated, be advantageously integrated mechanically into a single roller extending across the width of the strip 20 by means of interposed and relatively narrow insulation discs. Preferably such as integrated roller is of a length greater than the width of the paper, so as to bear against the strip across its width, directly opposite the line of engagement of lower metal roller 24 with the underside of the paper, with suitable terminal insulation to prevent undesired electrode contact or discharge externally adjacent the marginal edges of the strip.

By effectively dividing the upper treatment electrode 24 of FIGURE 2 into multiple electrically separate segments, it becomes possible to employ multiple separate discharge circuits each in readiness to eliminate an approaching conductive particle in the strip. If such a particle should be present under roller 24a at any particular instant, the condenser in its discharge circuit 44 of such roller segment 24a would discharge to eliminate the particle in question. As a random possibility, another conductive particle may be present under roller 24b at the same time. This other particle will likewise be eliminated, by virtue of the separately available charge in the individual condenser discharge circuit 42 connected to the roller 24b. Still another conductive particle may be carried under roller 24c a moment later. Despite the momentary discharged condition of the respective condensers in the discharge circuits 44 and 42 that are connected to the rollers 24a and 24b, roller 24c and its discharge circuit 40 is nonetheless effective to eliminate such a particle.

Each electrode segment 24a, 24b and 24c serves to treat a longitudinal zone on the paper strip, leaving the intervening zones untreated. These untreated zones are covered by a second set of electrode elements consisting of a common lower roller electrode 24 extending across the width of the strip and, for example, three spaced and coaxially disposed upper metal rollers 24d, 24e and 24f. The rollers 24d, 24e and 24f are preferably sized to be appreciably wider than the untreated zones and to thus overlap the previously treated areas and thereby subject most of the paper strip to double treatment possibility. As was the case with the first set of electrode elements, each electrode roller 24d, 24e and 24f is provided with its individual condenser discharge circuit 46, 48, 50.

The utilization of the above described two sets of electrode elements reduces the hazard of failing to remove a conductive particle longitudinally disposed in such close proximity to another particle as to be exposed to an electrode at a time when its condenser discharge circuit is not in a fully charged condition.

It is further conceivable even in carefully manufactured paper, that two conductive particles might approach any one segment roller, roller 24a for example, in quick succession. If such should happen, the second particle might survive the treatment and be disposed in the path of an insulating segment in the second set of electrodes. To avoid this posibility, another dual set of segmental treatment rollers is provided as shown in FIGURE 5, bearing numerals 24', 24a', 24b', etc. each having an individual discharge circuit. Any metal particle that might pass under a segmental roller of the first set 24a–24f due to the momentary discharged condition of its discharge circuit would be cleared by the second set of rollers 24a'–24f' and their respective energizing circuits.

As in FIGURE 2, each set of treatment rollers is desirably associated with a suction unit 22, for removing any particulate debris left by the treatment.

FIGURE 6 schematically illustrates still another form of treatment method and apparatus adapted for the treatment of wide tissues. In this embodiment the strip 60 is advanced again past two sets of electrode elements. The first set of electrode elements consists of a plurality, as shown by example, suitably three upper electrode rollers 62, 64 and 66 each covering a predetermined portion of the strip width and overlapping to assure coverage of the essentially full width thereby. Each of these rollers is associated with a companion roller disposed against the undersurface of the strip and each of said sets of roller electrodes is provided with its individual discharge circuit of the type heretofore described in conjunction with FIGURE 2 and herein schematically represented as the boxes 62a, 64a and 66a. To avoid the possibility that two particles might approach any one roller in such quick succession as to preclude clearing of the subsequent particle due to lack of energy in its discharge circuit, a second set of electrode elements is provided downstream of the above described first set of electrode elements. This second set of electrode elements can be identical with the heretofore described first set and includes, as illustrated, three upper rollers 68, 70, 72 each with its companion roller disposed beneath the strip and its own discharge circuit as represented by the boxes 74, 76, 78. Suction heads 22 may again be included to remove loose particulate matter from the strip surface.

As an alternative to the above described dual systems of FIGURES 5 and 6, the dielectric paper may be passed repeatedly through any one set of treatment rollers that cover the surface area of the paper, in order to be sure that all of the conductive particles have been cleared. The multi-segmental roller arrangement of FIGURE 5 and the sequenced roller arrangement of FIGURE 6 makes it practical to treat so-called "jumbo rolls" of wide manufactured strips of dielectric paper in one pass, which may then be longitudinally slit into separate narrow strips for wound condensers of small size. Slight contamination at the cut edge, however, normally will not detrimentally effect a finished condenser since such marginal edges are not usually disposed intermediate a pair of foils.

FIGURE 7 illustrates the disposition of a marginal untreated zone 36 that normally results in treated paper due to the required recessing of the electrode elements from the paper edge. Such untreated zones may be slit and discarded or may be left exposed in a wound condenser where the particles therein will have no effect.

In practice, the described method of treating unmetallized condenser tissue for eliminating the conductive particles therein represents an important advance in capacitor manufacture.

As will be now apparent, the treated tissues may be advantageously used for some or all of the dielectric layers disposed intermediate the capacitor electrodes to minimize, if not eliminate, the deteriorating effects of island discharge remote from the electrode surfaces therein. As will also now be apparent, utilization of the invention described herein permits the increasing of the permissable voltage that can be built up across the paper dielectric layers; effects savings in the amounts of nearly all dielectric materials required in capacitors of given voltage and capacitance ratings; permits utilization of fewer but thicker and less expensive dielectric tissues and yet permits reduction in size and weight. These results are of particular importance in large units such as so-called power capacitors, although these advances are also of importance in capacitors for signalling circuits wherein compactness is often a matter of great concern and wherein economy as to materials required is similarly a factor of importance.

By means of this invention it becomes possible to make a condenser having only one paper dielectric layer disposed between opposed electrodes of smooth foil.

The foregoing illustrative description of the invention in its various aspect naturally includes details that may be modified and variously applied by those skilled in the art and consequently the invention should be broadly considered in accordance with its full spirit and scope.

What I claim is:

1. The method of treating capacitor paper comprising the steps of passing bare dielectric paper between opposed electrodes in contact with the bare opposite surfaces of the paper and therewith applying to the paper the limited electrical energy stored in a recharge-restricted capacitor proportioned in relation to the paper to eliminate conductive particles therefrom, and thereafter subjecting opposite surfaces of the paper directly to suction for removal of loose particles remaining after the electrical treatment as aforesaid.

2. The method of treating capacitor paper comprising the steps of passing the paper between opposed electrodes in contact with the opposite bare surfaces of the paper and therewith applying to the paper the limited electrical energy stored in a recharge-restricted capacitor proportioned in relation to the paper to eliminate conductive particles therefrom, and subjecting opposite sides said paper to a strong direct suction both immediately before and immediately after electrical treatment as aforesaid for effecting preliminary removal loose particles before treatment and for removing loose particles remaining after the electrical treatment as aforesaid.

3. The method of making electrical capacitors including the steps of winding foil electrodes and bare paper layers of dielectric, and subjecting each said layer of paper to a combined electrical and vacuum treatment immediately prior to the actual winding operation, said treatment comprising the application of a pair of electrodes to the paper as it is drawn by the winding mandrel and therewith applying the discretely limited electrical charge of a recharge-restricted capacitor to directly opposite sides of the paper at any one instant and to all of the paper that is progressively drawn past the electrodes, the capacitor having a charge proportioned to eliminate conductive particles from the paper.

4. The method of producing conductive particle-free paper condenser tissue including the steps of advancing a wide strip of bare condenser tissue containing residual conductive particles between a plurality of opposed contacting electrodes each engaging only a portion of the width of said strip but collectively engaging all of the width of said strip and selectively discharging the limited stored energy of respective indivdual electrode-associated capacitors in the form of short-duration high-intensity pulses proportions eliminate paper contained conductive particles when the latter are disposed intermediate said electrodes.

5. The method of clearing paper condenser tissue of conductive particles including the steps of repeatedly subjecting bare condenser tissue to the progressive action of opposed smooth faced electrodes having a high-voltage recharge-limited condenser discharge circuit connected thereacross adapted to effect short duration electrical discharge through a conductive particle disposed intermediate said electrodes of an energy content proportioned to clear said conductive particles, whereby particles not cleared during any one treatment due to the momentary discharged condition of the circuit will be cleared in a subsequent one of the repeated treatments.

References Cited by the Examiner

UNITED STATES PATENTS

| | | | |
|---|---|---|---|
| 692,834 | 2/02 | Davis | 219—69 |
| 692,989 | 2/02 | Davis | 219—384 |
| 1,850,702 | 3/32 | Allen | 162—138 |
| 1,909,079 | 5/33 | Steerup | 117—200 |
| 2,113,714 | 4/38 | Stein | 219—393 |
| 2,379,846 | 7/45 | Wilsey et al. | 219—383 |
| 2,435,441 | 2/48 | Grouse | 117—102 |
| 2,608,717 | 9/52 | Kay | 162—192 X |
| 2,627,645 | 2/53 | Harris | 29—25.42 |
| 2,774,018 | 12/56 | Weiss | 317—260 |
| 2,861,231 | 11/58 | Robinson et al. | 317—260 |
| 3,015,014 | 12/61 | Gartner et al. | 117—71 |
| 3,057,075 | 10/62 | Lippke | 162—192 |

RICHARD M. WOOD, *Primary Examiner.*

JOHN F. BURNS, *Examiner.*